(No Model.)
S. JOHNSON.
WHEEL HUB.
No. 525,550.  Patented Sept. 4, 1894.
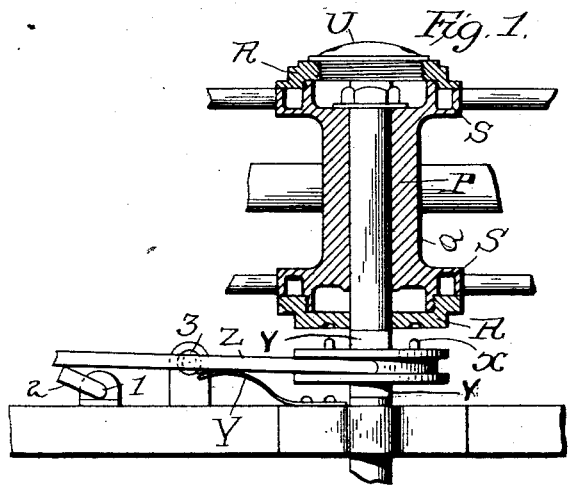
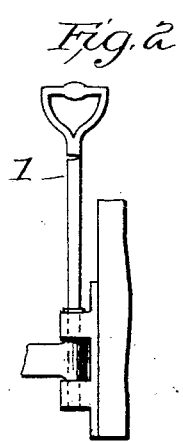
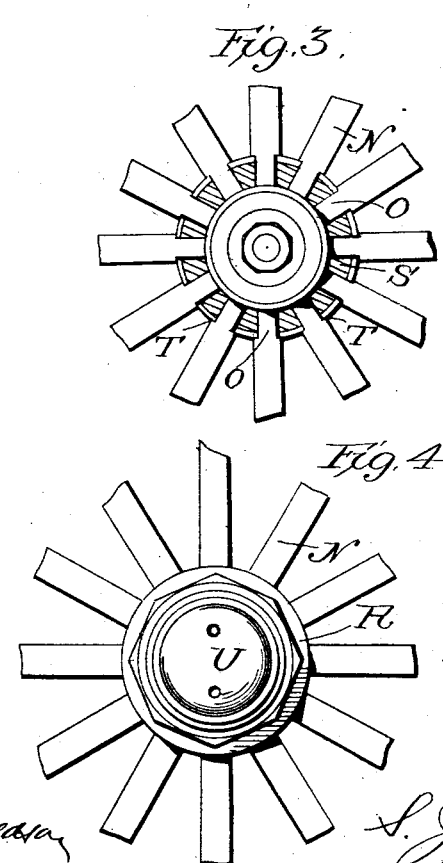
Attest
Walter Donaldson
F. L. Middleton
Inventor
S. Johnson
by Richards & Co
Attys

UNITED STATES PATENT OFFICE.

SIDNEY JOHNSON, OF LONDON, ENGLAND.

WHEEL-HUB.

SPECIFICATION forming part of Letters Patent No. 525,550, dated September 4, 1894.

Application filed September 15, 1892. Renewed January 15, 1894. Serial No. 496,994. (No model.)

*To all whom it may concern:*

Be it known that I, SIDNEY JOHNSON, a subject of Victoria, Queen of Great Britain and Ireland, residing at 4 Ley Street, Ilford, London, in the county of Essex, England, have invented certain new and useful Improvements in Wheel-Hubs; and I do hereby declare the following to be a full, clear, and exact description of the invention.

The invention relates to wheel hubs and includes an improved arrangement of the spokes and cap plates for holding the spokes in place and in addition, a clutch for engaging the wheel with the axle.

In the drawings:—Figure 1, is a sectional view of the hub with the clutch in plan. Fig. 2, is a view of the handle for operating the clutch. Figs. 3 and 4 show details relating to the spokes and caps.

The wheel is made up of light spokes N detachably connected to the hub P. The inner ends of the spokes are tenoned and shouldered as at O and are fitted to corresponding recesses in each end of the hub. This hub P is metal and has a central opening to receive the axle Q. Each end of the hub P is flanged and threaded to receive a screw cap R which closes the recesses in which the spokes are fitted and keep them in place. These recesses are located in a ring S forming a part of the flange of the hub, the tenons O of the spokes fitting in the indents T T. As the cap R holds them in place any spoke may be removed by unscrewing the cap. The outer cap R has a supplemental cap U which is removable to gain access to the end of the axle. The inner cap R has a flat face formed with indentations and the axle has a squared part V on which is located a clutch having projections $x$ for engaging the indentations in the face of the inner cap R.

The clutch is operated through a bifurcated lever Z pivoted at 3 and this is operated by a hand lever 1 having a projection 2 bearing against the lever Z. A spring Y returns the clutch.

I claim—

1. In combination with the hub P, the spokes held thereto by the metal caps R, the inner cap having recesses in its face, and a movable clutch plate having projections to engage the recesses, substantially as described.

2. In combination with the hub P, the spokes held thereto by the metal caps R, the inner cap having recesses, the clutch plate, a pivoted lever Z under spring tension and a lever 1 having a projection 2 for operating said lever Z, substantially as described.

In testimony whereof I affix my signature in the presence of two witnesses.

SIDNEY JOHNSON.

Witnesses:
    ARTHUR H. STANLEY,
    WILLIAM WILTON POPPLEWELL,
*Both of 17 Southampton Buildings, London, W. C.*